United States Patent
Schwan et al.

[15] 3,681,349
[45] Aug. 1, 1972

[54] 1-(SUBSTITUTED BENZYL) TETRAHYDRO-2-(1H) PYRIMIDONES

[72] Inventors: Thomas J. Schwan; Stanley E. Burrous, both of Norwich; James L. Butterfield, New Berlin, all of N.Y.

[73] Assignee: Morton-Norwich Products, Inc.

[22] Filed: March 5, 1970

[21] Appl. No.: 16,982

[52] U.S. Cl..........260/251 R, 260/256.4 C, 424/251
[51] Int. Cl...............................................C07d 51/38
[58] Field of Search....................260/251 R, 256.4 C

[56] References Cited

UNITED STATES PATENTS 3,536,699  10/1970  Von Brachel et al......260/239.3

OTHER PUBLICATIONS

Von Brachel et al., C. A. 70,20059Z (1969), Abstract of British Patent 1,130,904 of Oct. 16, 1968.

Primary Examiner—Alex Mazel
Assistant Examiner—R. V. Rush
Attorney—Bradford S. Allen

[57] ABSTRACT

Novel 1-(substituted benzyl)tetrahydro-2-(1H)pyrimidones of the formula:

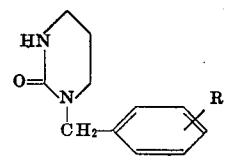

where R in the 4-position is amino, hydrogen, acetylamino, halo, hydroxy, phenyl or methoxy; in the 3 position nitro or fluoro; and in the 3,4-positions dichloro are useful as central nervous system stimulants and mydriatics upon intraperitoneal administration to animals in doses of from 50–100 mg./kg.

13 Claims, No Drawings

1-(SUBSTITUTED BENZYL) TETRAHYDRO-2-(1H) PYRIMIDONES

This invention relates to chemical compounds. More particularly it is concerned with a new series of compounds of the 1-(substituted benzyl) tetrahydro-2-(1H)pyrimidone class represented by the formula:

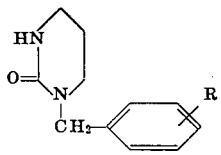

where R in the 4 position is amino, hydrogen, acetylamino, halo, hydroxy, phenyl or methoxy; in the 3 position nitro or fluoro; and in the 3,4-positions dichloro. It is also concerned with methods for preparing these compounds.

The compounds of this invention possess pharmacological activity. Their pharmacological activity is evidenced in animals in stimulation of the central nervous system and by mydriasis. Thus, these compounds when administered in a single intraperitoneal dose of 50–100 mg./Kg. suspended in 0.5 percent methyl cellulose (4,000 cps) in water to rats, caused increased spontaneous motor activity and mydriasis commencing about thirty minutes post dosing and persisting for from two to four hours thereafter.

The compounds of this invention are readily prepared. Illustrative schema for the preparation thereof are depicted here below:

(a) 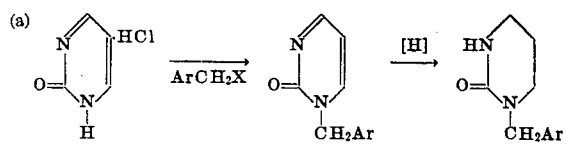

In this scheme Ar represents

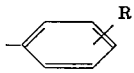

wherein R is as above stated and X is halogen. The first step is conducted in the presence of a base such as potassium carbonate and a catalyst such as sodium or potassium iodide. A solvent inert under the conditions of the reaction such as dimethylformamide or methanol is employed.

The hydrogenation step is effectively carried out in the presence of platinum oxide or palladium on carbon in a solvent such as methanol.

(b) 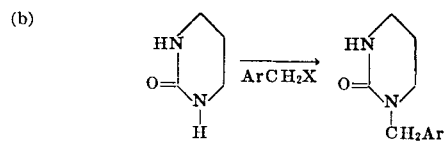

In this scheme Ar and X have the significance given in (a). The reaction conditions are substantially those in the first step of (a).

In order that this invention may be readily available to and understood by those skilled in the art the following illustrative examples are appended:

EXAMPLE I

A. 1-(p-Nitrobenzyl)-2(1H)pyrimidone

To a solution of 133 g. (1.0 mole) of 2-hydroxypyrimidine hydrochloride in 2. 0 1. methanol was added 276 g. (2.0 moles) of potassium carbonate. Potassium iodide (40 g.) and p-nitrobenzyl bromide (216 g., 1.0 mole) were added rapidly and the mixture was stirred and refluxed for 5 hr. After the cooled reaction mixture was added to 6 l. cold water with stirring, the resulting suspension was stirred for one hr. and filtered. The solid was washed with three 500-ml. portions of water, and dried at 100° to give 214.5 g. (93%), m.p. 191°–196°.

B. 1-(p-Aminobenzyl)-3,4,5,6-tetrahydro-2(1H)pyrimidone

A mixture of 69.3 g. (0.30 mole) of A in 800 ml. methanol was shaken with hydrogen in the presence of 1.8 g. platinum oxide on a Parr apparatus. At the end of 3 hr. the uptake of hydrogen had ceased and the theoretical quantity had been consumed. After the catalyst was filtered and washed with two 100-ml. portions of methanol, the filtrate and combined washings were concentrated to dryness in vacuo. The crude product was recrystallized from acetonitrile to give in two crops 48.5 g. (79%) of B, m.p. 156°–161°. An analytical sample, m.p. 161°–163°, was obtained by recrystallization from acetonitrile.

Anal. Calcd. for $C_{11}H_{15}N_3O$: C, 64.37; H, 7.37; N, 20.47

Found: C, 46.38; H, 7.25: N, 20.32.

EXAMPLE II

A. 1-Benzyl-2(1H)-pyrimidone

To a solution of 66.5 g. (0.50 mole) of 2-hydroxypyrimidine hydrochloride in 1. 4. 1. methanol was added 93.2 g. (0.88 mole) sodium carbonate. Sodium iodide (10 g.) and benzyl bromide (68.4 g., 0.40 mole) were added rapidly and the mixture was stirred and refluxed for 19 hr. The mixture was concentrated to dryness in vacuo and the residue was extracted with three 200-ml. of chloroform. The combined extracts were washed with 300 ml. water, dried over magnesium sulfate, and concentrated to dryness. Recrystallization from toluene gave 45.5 g., m.p. 138°–140°.

B. 1-Benzyl-3,4,5,6-tetrahydropyrimidone

A reaction vessel was charged with a suspension of A (92 g., 0.49 moles) and platinum oxide (1 g.) in 150 ml. of methanol. This suspension was shaken in a hydrogen atm., under pressure, until the theoretical quantity of hydrogen was consumed. After sufficient cooling the mixture was filtered and the filtrate was concentrated to dryness leaving 91 g. (95%) of B.

An analytical sample, m.p. 164°–165°, was obtained by recrystallization from acetonitrile (10 ml./g.).

Anal. Calcd. for $C_{11}H_{14}N_2O$: C, 69.44; H, 7.42; N, 14.73.

Found: C, 69.74; H, 7.46; N, 14.71.

EXAMPLE III 1-(m-Nitrobenzyl)-3,4,5,6-tetrahydro-2(1H)-pyrimidone

A suspension of tetrahydro-2-pyrimidone (24.7 g., 0.25 mole), $K_2CO_3$ (30.9 g., 0.24 mole), KI (18.6 g., 0.11 mole) and m-nitrobenzyl chloride (43.0 g., 0.25 mole) in 128 ml. of dimethylformamide was heated rapidly, over 0.3 hr., with stirring to 110° for 2.5 hr. The hot reaction mixture was poured into 2. 1 1. of ice water, stirred for 0.5 hr. and filtered. The solid was washed with water and air dried overnight, m.p. 131°–139°, yield: 29 g. (49%).

The crude product was recrystallized from 1. 5 1. of methanol (Darco) to give 4.5 g. of dimethyl(bis-m-nitrobenzyl)ammonium iodide, m.p. 208°–216°.

The filtrate was concentrated to dryness and the crystalline solid was recrystallized from 1 1. of water, discarding 6–7 ml. of dark insoluble oil. The white solid was washed with water and dried for 5 hr. in the 60° oven, m.p. 144°–146°. Yield: 12 g. (20%)

Anal. Calcd. for $C_{11}H_{13}N_3O_3$: C, 56.16; H, 5.57; N, 17.86.

Found: C, 55.99; H, 5.63; N, 17.52.

EXAMPLE IV 1-(p-Acetamidobenzyl)-3,4,5,6-tetrahydro-2(1H)pyrimidone

A slurry of the compound of Example I (20.5 g., 0.10 mole) and $K_2CO_3$ (20.5 g., 0.15 mole) in 500 ml. of benzene was treated with acetyl chloride (12.0 g., 0.15 mole). The reaction mixture was heated to reflux over 1 hr., held at reflux for 3 hr. with stirring and concentrated to dryness under reduced pressure. The residue was taken up in 250 ml. of water, stirred for 0.3 hr. and filtered. The solid was washed with water and air dried, m.p. 198°–210°. Yield: 23 g. (92%).

The product was recrystallized from 180 ml. of methanol, m.p. 219°–226°. Yield: 12 g. (48%).

Anal. Calcd. for $C_{13}H_{17}N_3O_2$: C, 63.14; H, 6.93; N, 16.99.

Found: C, 62.88; H, 7.00; N, 16.96.

EXAMPLE V

A. 1-(p-Chlorobenzyl)-2(1H)pyrimidone

2-Hydroxypyrimidine hydrochloride (39.9 g., 0.3 mole) in 720 ml. methanol was slowly treated with sodium carbonate (63.6 g., 0.6 mole) followed by a solution of p-chlorobenzyl chloride (48.3 g., 0.3 mole) and sodium iodide (22.5 g., 0.15 mole) in 120 ml. methanol. The suspension was refluxed for 24 hr., filtered, and the filtrate was concentrated leaving a viscous oil. Water (300 ml.) was added to the oil producing 54 g. (82% after drying at 60°) of white solid.

B. 1-(p-Chlorobenzyl)-3,4,5,6-tetrahydro-2(1H)-pyrimidone

A 17 g. (0.076 mole) portion of A, 150 ml. of methanol of 0.3 g. of $PtO_2$ were placed in a 0. 5 1. pressure bottle and subjected to hydrogenation at 40 psig. The hydrogen uptake was 164 # (theory: 154 # ) in 1 hr. The reduction mixture was warmed, decolorized and filtered. The filtrate was concentrated to dryness under reduced pressure to give 14 g. (82%) of a white crystalline product, m.p. 131°–133°.

The product was recrystallized from 40 ml. of acetonitrile, m.p. 131°–133°. Yield: 10.7 g. (62%).

Anal. Calcd. for $C_{11}H_{13}ClN_2O$: C, 58.80; H, 5.83; N, 12.47.

Found: C, 59.09; H, 6.00; N, 12.45.

EXAMPLE VI

A. 1-(p-Methoxybenzyl)-2(1H)pyrimidone

A 62.5 g. (0.47 mole) portion of 2-hydroxypyrimidine hydrochloride in 350 ml. of methanol was treated with 133 g. (0.94 mole) of $K_2CO_3$ (Caution - foaming), and 39 g. (0.24 mole) of KI. The slurry was treated with 73.6 g. (0.47 mole) of p-methoxybenzyl chloride, over a period of 0.2 hr., using rapid stirring. A rise in temperature to 60° was noted. The reaction mixture was heated at reflux for 6.0 hr. and stored overnight at room temperature. The slurry was poured into 400 ml. of water, stirred for 0.5 hr. and extracted with 600 ml. of $CHCl_3$. The $CHCl_3$ extracts were washed with water, dried over $MgSO_4$ overnight, and concentrated to dryness under reduced pressure to give 80 g. of crude product.

The crude product was recrystallized from 110 ml. of acetonitrile to give a white solid, m.p. 129°–131°. Yield: 37 g. (37%).

B. 1-(p-Methoxybenzyl-3,4,5,6-tetrahydro-2(1H)pyrimidone

A 16.0 g. (0.074 mole) portion of 1-(p-methoxybenzyl)-2(1H)pyrimidone, 150 ml. of methanol and 0.3 g. of $PtO_2$ were placed in a pressure bottle and subjected to hydrogenation at 40 psig. The reduction mixture was warmed, decolorized and filtered. The filtrate was concentrated to dryness to give 16.1 g. (99%) of a white solid, m.p. 102°–103°.

The product was recrystallized from 40 ml. of acetonitrile, m.p. 107°–108°. Yield: 10.7 g. (66%).

Anal. Calcd. for $C_{12}H_{16}N_2O_2$: C, 65.43; H, 7.32; N, 12.72.

Found: C, 65.46; H, 7.36; N, 12.69.

EXAMPLE VII

A. 1-(p-Phenylbenzyl)-2(1H)pyrimidone

A 14.7 g. (0.11 mole) portion of 2-hydroxyprimidine hydrochloride in 180 ml. of methanol was treated with 30.6 g. (0.22 mole) of $K_2CO_3$ (Caution - foaming), 9.0 g. (0.054 mole) of KI and 27.5 g. (0.11 mole) of p-phenylbenzyl bromide. The reaction mixture was refluxed 3 hr. and concentrated to dryness under reduced pressure. The residue was taken up in 1. 2 1. of water and extracted with 1. 7 1. of $CHCl_3$. The extracts were dried over $MgSO_4$ (Darco), filtered and concentrated under reduced pressure to give 28 g. (97%) of the desired product.

The product was recrystallized from 2. 3 1. of acetonitrile, m.p. 230°–231°. Yield: 22 g. (76%).

B. 1-(p-Phenylbenzyl)-3,4,5,6-tetrahydro-2(1H)pyrimidone

A 17 g. (0.065 mole) portion of 1-(p-phenylbenzyl)-2(1H)pyrimidone, 150 ml. of ethanol, and 0.3 g. of $PtO_2$ were placed in a 0. 5 1. pressure bottle and subjected to hydrogenation at 40 psig. The hydrogen uptake was 156 # (theory: 130 # ) in 5.5 hr. The reduction mixture was diluted to a volume of 400 ml. with methanol, warmed, decolorized, filtered, refrigerated for two days, and filtered. The white solid was washed with methanol, ether and dried, m.p. 174°–178°. Yield: 14 g. (82%).

Anal. Calcd. for $C_{17}H_{18}N_2O$: C, 76.66; H, 6.81; N, 10.52.

Found: C, 76.71; H, 6.78; N, 10.58.

EXAMPLE VIII

A. 1-(p-Fluorobenzyl)-2(1H)pyrimidone

A 46.5 g. (0.35 mole) portion of 2-hydroxypyrimidine hydrochloride in 500 ml. of methanol was treated with 97.0 g. (0.70 mole) of $K_2CO_3$ (Caution - foaming), 29.0 g. (0.18 mole) of KI and 50.5 g. (0.35 mole) of p-fluorobenzyl chloride. The reaction mixture was refluxed for 24 hr. and concentrated to dryness under reduced pressure. The residue was taken up in 400 ml. of water and extracted with 600 ml. of $CHCl_3$. The chloroform extract was dried over $MgSO_4$ (Darco), filtered and concentrated to dryness to give 65 g. (92%) of crude product.

The crude product was recrystallized from 200 ml. of acetonitrile, m.p. 149°–157°. Yield: 37 g. (52%)

B. 1-(p-Fluorobenzyl)-3,4,5,6-tetrahydro-2(1H)pyrimidone

A 17.0 g. (0.083 mole) portion of 1-(p-fluorobenzyl)-2(1H)pyrimidone, 0.3 g. of $PtO_2$ and 150 ml. of methanol were placed in a pressure bottle and subjected to hydrogenation at 40 psig. The hydrogen uptake was 185 # (theory: 167 # ) in 2 hr. The reduction mixture was warmed, decolorized, filtered, and concentrated to dryness under reduced pressure to give 16.9 g. (97%) of a white solid, m.p. 136°–140°.

Anal. Calcd. for $C_{11}H_{13}FN_2O$: C, 63.45; H, 6.29; N, 13.46.

Found: C, 63.50; H, 6.12; N, 13.52.

EXAMPLE IX

A. 1-(p-Benzyloxybenzyl)-2(1H)pyrimidone

A 15.4 g. (0.12 mole) portion of 2-hydroxypyrimidine hydrochloride in 150 ml. of dimethylformamide was treated with 32.0 g. (0.24 mole) of $K_2CO_3$ (Caution - foaming), 9.5 g. (0.057 mole) of KI and 26.7 g. (0.12 mole) of p-benzyloxybenzyl chloride. The reaction mixture was warmed to 115° over 0.3 hr. and held at 115° for 2.5 hr. The slurry was poured into 0. 7 l. of ice water, stirred for 1 hr. and filtered. The off-white crystalline solid was washed with water and air dried, m.p. sinter 100°, 125°–142°. Yield: 31 g. (89%).

The crude product was recrystallized from 160 ml. of acetonitrile, m.p. 163°–168°. Yield: 13.5 g. (38%).

B. 1-(p-Hydroxybenzyl)-3,4,5,6-tetrahydro-2(1H)pyrimidone

A 16.4 g. (0.056 mole) portion of 1-(p-benzyloxybenzyl)-2(1H)pyrimidone, 16 g. of 5% Pd/C (50% moisture) and 150 ml. of methanol were placed in a pressure bottle and subjected to hydrogenation at 40 psig. The hydrogen uptake was 15 lb. (theory: 14 lb.) in 22 hr. The reduction mixture was warmed, decolorized, filtered, and concentrated to dryness under reduced pressure to give 13 g. of a crude crystalline product.

The crude product was recrystallized from 1. 2 l. of acetone, m.p. 182°–185°. Yield: 5.0 g. (43%).

Anal. Calcd. for $C_{11}H_{14}NO_2$: C, 64.06; H, 6.84; N, 13.59.

Found: C, 63.98; H, 6.86; N, 13.33.

EXAMPLE X

A. 1-(p-Bromobenzyl)-2(1H)pyrimidone

A 32.5 g. (0.24 mole) portion of 2-hydroxypyrimidine hydrochloride in 500 ml. of methanol was treated with 69.0 g. (0.50 mole) of $K_2CO_3$ (Caution - foaming), 20.8 g. (0.13 mole) of KI and 62.5 g. (0.25 mole) of α p-dibromotoluene. The reaction mixture was refluxed for 24 hr. and concentrated to dryness under reduced pressure. The residue was taken up in 500 ml. of $H_2O$ and extracted with 600 ml. of $CHCl_3$. The chloroform extracts were washed with $H_2O$, dried over $MgSO_4$ (Darco), filtered and concentrated to dryness under reduced pressure to give 68 g. of a tacky yellow solid.

The crude product was crystallized from 180 ml. of acetonitrile to give 45 g. (70%) of an off-white solid, m.p. 143°–148°.

B. 1-(p-Bromobenzyl)-3,4,5,6-tetrahydro-2(1H)pyrimidone

A 22 g. (0.08 mole) portion of 1-(p-bromobenzyl)-2(1H)pyrimidone, 150 ml. of methanol and 0.3 g. of $PtO_2$ were placed in a 0. 5 l. pressure bottle and subjected to hydrogenation at 40 psig. The hydrogen uptake was 196 # (theory: 166 # ) in 2 hr. The reduction mixture was warmed, decolorized, filtered and concentrated to dryness under reduced pressure to give 23.6 g. of a crude tacky product.

The crude product was crystallized from 40 ml. of acetonitrile to give 9.7 g. (43%) of a white crystalline product, m.p. 136°–141°.

The crystallized product was taken up in 90 ml. of $CHCl_3$ treated with 6 g. of $NaHCO_3$, warmed 1 hr., filtered and concentrated to dryness, m.p. 133°–136°. Yield: 9.0 G. (40%).

The bicarbonate treated product was recrystallized from 25 ml. of acetone, m.p. 135°–137°. Yield: 4.5 g. (21%).

Anal. Calcd. for $C_{11}H_{13}BrN_2O$: C, 49.09; H, 4.87; N, 10.41.

Found: C, 49.04; H, 4.86; N, 10.33.

EXAMPLE XI

A. 1-(3,4-Dichlorobenzyl)-2(1H)pyrimidone

A 53.2 g. (0.40 mole) portion of 2-hydroxypyrimidine hydrochloride in 850 ml. of methanol was treated with 110.4 g. (0.80 mole) of $K_2CO_3$ (Caution - foaming), 33.2 g. (0.20 mole) of KI and 78.2 (0.40 mole) of α -3,4-trichlorotoluene. The reaction mixture was refluxed for 24 hr. and concentrated to dryness under reduced pressure. The residue was taken up in 500 ml. of $H_2O$, stirred for 2 hr. and filtered. The yellowish solid was washed with 600 ml. of $H_2O$ and air dried, m.p. 190°–197°. Yield: 86 g. (84%).

The crude product was recrystallized from 800 ml. of acetonitrile, m.p. 209°–212°. Yield. 57 g. 56%).

B. 1-(3,4-Dichlorobenzyl)-3,4,5,6-tetrahydro-2(1H)pyrimidone

A 38 g. (0.15 mole) portion of 1-(3,4-dichlorobenzyl)-2(1H)pyrimidone, 260 ml. of methanol and 0.6 g. of $PtO_2$ were placed in a 0. 5 l. pressure bottle and subjected to hydrogenation at 45 psig. The hydrogen uptake was 26 # (theory: 26 # ) in 7 hr. The reduction mixture was warmed, decolorized, filtered and concentrated to dryness to give 38 g. (97%) of a white crystalline solid, m.p. soften 100°, 105°–115π⅞.

The product was recrystallized from 110 ml. of acetonitrile, m.p. 116°–119°. Yield: 30 g. (77%).

Anal. Calcd. for $C_{11}H_{12}Cl_2N_2O$: C, 50.98; H, 4.67; N, 10.81.

Found: C, 51.15; H, 4.71; N, 10.90.

EXAMPLE XII

A. 1-(m-Fluorobenzyl)-2(1H)pyrimidone

A 46.5 g. (0.34 mole) portion of 2-hydroxypyrimidine hydrochloride in 500 ml. of methanol was treated with 97.0 g. (0.7 mole) of $K_2CO_3$ (Caution - foaming), 29.0 g. (0.18 mole) of KI and 50.5 g. (0.35 mole) of m-fluorobenzyl chloride. The reaction mixture was refluxed for 24 hr. and concentrated to dryness under reduced pressure. The residue was taken up in 300 ml. of $H_2O$ and extracted with 400 ml. of $CHCl_3$. The $CHCl_3$ extract was dried over $MgSO_4$ (Darco), filtered and concentrated to dryness to give 65 g. (90%) of a tacky yellow solid.

The crude product was recrystallized from 140 ml. of acetonitrile, m.p. 134°–136°. Yield: 35 g. (49%)

B. 1-(m-Fluorobenzyl)-3,4,5,6-tetrahydro-2(1H)pyrimidone

A 20.0 g. (0.098 mole) portion of 1-(m-fluorobenzyl)-2(1H)pyrimidone, 150 ml. of methanol and 0.3 g. of $PtO_2$ were placed in a 0. 5 l. pressure bottle and subjected to hydrogenation at 45 psig. The hydrogen uptake was 17 ♯ (theory: 17 ♯ ) in 1.6 hr. The reduction mixture was warmed, decolorized, filtered and concentrated to dryness under reduced pressure to give 20.0 g. (98%) of a white crystalline solid, m.p. 143°–146°.

The product was recrystallized from 50 ml. of acetonitrile, m.p. 146°–148°. Yield: 17.0 g. (83%).

Anal. Calcd. for $C_{11}H_{13}FN_2O$: C, 63.45; H, 6.29; N, 13.46.

Found: C, 63.67; H, 6.25; N, 13.62.

What is claimed is:

1. A compound of the formula

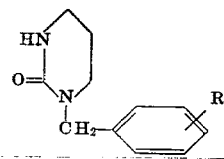

wherein R in the 4 position is amino, hydrogen, acetylamino, halo, hydroxy, phenyl, or methoxy; in the 3 position nitro or fluoro; and in the 3,4 positions dichloro.

2. The compound 1-(p-aminobenzyl)-3,4,5,6-tetrahydro-2(1H)pyrimidone.

3. The compound 1-benzyl-3,4,5,6-tetrahydro-2(1H)pyrimidone.

4. The compound 1-(m-nitrobenzyl)-3,4,5,6-tetrahydro-2(1H)pyrimidone.

5. The compound 1-(p-acetamidobenzyl)-3,4,5,6-tetrahydro-2(1H)pyrimidone.

6. The compound 1-(p-chlorobenzyl)-3,4,5,6-tetrahydro-2(1H)pyrimidone.

7. The compound 1-(p-methoxybenzyl)-3,4,5,6-tetrahydro-2(1H)pyrimidone.

8. The compound 1-(p-phenylbenzyl)-3,4,5,6-tetrahydro-2(1H)pyrimidone.

9. The compound 1-(p-fluorobenzyl)-3,4,5,6-tetrahydro-2(1H)pyrimidone.

10. The compound 1-(p-hydroxybenzyl)-3,4,5,6-tetrahydro-2(1H)pyrimidone.

11. The compound 1-(p-bromobenzyl)-3,4,5,6-tetrahydro-2(1H)pyrimidone.

12. The compound 1-(3,4-dichlorobenzyl)-3,4,5,6-tetrahydro-2(1H)pyrimidone.

13. The compound 1-(m-fluorobenzyl)-3,4,5,6-tetrahydro-2(1H)pyrimidone.

* * * * *

PO-1050
(5/69)

UNITED STATES PATENT OFFICE
CERTIFICATE OF CORRECTION

Patent No. 3,681,349          Dated August 1, 1972

Inventor(s) Thomas J. Schwan, Stanley E. Burrous and James L. Butterfield

It is certified that error appears in the above-identified patent and that said Letters Patent are hereby corrected as shown below:

Column 2, line 39 "46.38" should be --64.38--

Signed and sealed this 2nd day of January 1973.

(SEAL)
Attest:

EDWARD M. FLETCHER, JR.          ROBERT GOTTSCHALK
Attesting Officer                   Commissioner of Patents